US005308709A

United States Patent [19]

Ogino et al.

[11] Patent Number: 5,308,709

[45] Date of Patent: May 3, 1994

[54] PROCESS FOR FORMING COMPOSITE FILM ON ALUMINUM OR ALUMINUM ALLOY ARTICLE SURFACE AND RESULTING PRODUCT

[75] Inventors: Takao Ogino; Ryoji Morita; Shigeo Tanaka, all of Tokyo, Japan

[73] Assignee: Nihon Parkerizing Co., Ltd., Tokyo, Japan

[21] Appl. No.: 824,409

[22] Filed: Jan. 23, 1992

[30] Foreign Application Priority Data

Jan. 29, 1991 [JP] Japan ................................ 3-009055

[51] Int. Cl.[5] ........................ B32B 15/04; B32B 15/08; B05D 1/36

[52] U.S. Cl. ................................ 428/623; 428/423.1; 428/457; 428/626; 427/327; 427/387; 427/388.1; 427/409; 427/419.5; 148/251; 148/264

[58] Field of Search ............... 427/304, 305, 319, 320, 427/333, 340, 344; 148/246, 250, 251; 428/623, 626, 423.1, 457

[56] References Cited

U.S. PATENT DOCUMENTS 3,832,962 9/1974 Rolles ................................ 428/626
4,719,038 1/1988 Sobata et al. ........................ 252/511
4,853,285 8/1989 Sobata et al. ........................ 428/336
4,939,034 7/1990 Sobata et al. ........................ 252/511
4,994,121 2/1991 Sobata et al. ........................ 148/251
5,061,575 10/1991 Mohri et al. ........................ 428/626

FOREIGN PATENT DOCUMENTS 62-289275 12/1987 Japan .
63-83172 4/1988 Japan .

*Primary Examiner*—Anthony McFarlane
*Attorney, Agent, or Firm*—Ladas & Parry

[57] ABSTRACT

A film forming process which imparts excellent formability, corrosion resistance and paintability to the surface of aluminum or aluminum alloy plates or aluminum-plated sheet steel.

A process for forming composite film on the surface of aluminum or aluminum alloy plates which comprises preliminarily treating the surface with a chromating liquid to form a chromate film on the surface, and then coating on the chromate film an organic macromolecular resin composition comprising urethane resin and at least one kind of resin selected from polyester resin and epoxy resin, a wax as a lubricating additive and further a silica sol, followed by drying, to form a film layer.

10 Claims, No Drawings

PROCESS FOR FORMING COMPOSITE FILM ON ALUMINUM OR ALUMINUM ALLOY ARTICLE SURFACE AND RESULTING PRODUCT

BACKGROUND OF THE INVENTION

The present invention relates to a novel film forming process which can impart excellent formability, corrosion resistance and paintability to the surface of aluminum or aluminum alloy plates or aluminum-plated steel sheet (these being hereinafter simply referred to as aluminum plates). In more particular, the invention relates to a composite film forming process suitable for aluminum plates which are subjected to processing, such as press working and the like, and used for forming structures by bonding or assembling them with steel sheet, zinc base plated steel sheet and the like by such means of joining as adhesion, bolting and so forth.

Aluminum plates are extensively used by fabricators and assemblers, for example, in household electric appliances, automobiles, building materials, etc. Most of the aluminum plates are fabricated, assembled and thereafter painted.

In said process of forming, since aluminum plates as such have insufficient formability, lubricants represented by press oil are generally coated thereon as a remedial measure in advance to forming at the working site.

When assembling and painting are conducted after forming, it is indispensable for the process to remove residual lubricating film in advance to painting, which requires degreasing and cleaning operations.

In recent years, methods have been proposed, with the aim of simplifying process steps, reducing cost and improving working environment, which intend to omit the use of press oil in forming process by using aluminum plates of which the surface has been coated with wax-based lubricants beforehand. In such methods, however, the coated lubricant must be removed at the beginning in the process of painting subsequent to the next step of assembling. Moreover, although the working environment in pressing the aluminum plates coated with wax-based lubricants is improved to some extent as compared with that in using press oil, it cannot be regarded as satisfactory.

Accordingly, proposals have been made of functional surface treated aluminum plates having more adequate lubricity.

Prior art techniques relating to functional surface treated aluminum plates include those disclosed in (A) Japanese Patent Application Kokoku (Post-Exam. Publn.) No. 63-25032, (B) Japanese Patent Application Kokai (Laid-open (unexamined)) No 62-289275 and (C) Japanese Patent Application Kokai (Laid-open) No. 63-83172. These prior art techniques will be outlined below.

(A) relates to an aqueous composition for forming lubricating coating film containing as main components a lubricant and an organic-inorganic composite reaction product comprising a water-soluble or water-dispersible organic resin, an alkoxysilane compound and silica. Since the film of an organic-inorganic composite reaction product is poor in flexibility, even when it contains a lubricating component the film cannot follow the high speed forming and is unsatisfactory in lubricity.

(B) relates to a film comprising as main components a composite substance or mixed substance consisting of urethane resin, silicon dioxide and fluororesin. Films of such compositions, however, cannot exhibit a high lubricating property as intended by the present inventors.

(C) relates to a composition comprising a resin composition composed of an organic resin selected from epoxy resin, polyester resin and acrylic resin and a curing agent component and a lubricating substance incorporated into the resin composition. The formability attainable by the surface treatment based on the above-mentioned composition, however, is still insufficient for achieving a high degree of forming intended by the present inventors.

As outlined above, the prior art methods of surface treatment which intend to impart good form-ability, corrosion resistance and paintability to the surface of aluminum or aluminum alloy plates have been unable to satisfy the requirements for high degree of formability, corrosion resistance and paintability.

The object of the present invention is to provide, overcoming the problems mentioned above, a process for forming a functional composite film which can impart a high degree of formability, i.e. an excellent lubricity, to the surface of said aluminum plates and also is excellent in corrosion resistance, paintability and chemical resistance.

SUMMARY OF THE INVENTION

The present inventors have made extensive study to attain a process which can satisfy the requirement for high degree of formability, corrosion resistance, paintability and chemical resistance and, as a result, have made the present invention. The present invention relates to a process for forming composite film on the surface of aluminum plates which is excellent in formability, corrosion resistance and paintability which process comprises preliminarily applying a chromate treatment onto the surface of aluminum or aluminum alloy plates to form a chromate film layer (in an amount of 10–150 $mg/m^2$ as metallic chromium) and then coating on the chromate film an organic macromolecular resin composition comprising urethane resin and at least one kind of resin selected from polyester resin and epoxy resin, a wax (of a saponification value of 30 or less) as a lubricating additive [in an amount of 5–20% by weight (hereinafter simply referred to as %) of total solids], and further a silica sol (in an amount of 5–30% as solid relative to total solids), followed by drying, to form a film layer (in an amount of 1–10 $g/m^2$).

DETAILED DESCRIPTION OF THE INVENTION

In the process of the present invention, it is necessary first to form a chromate film in an amount of 10–150 $mg/m^2$ in terms of metallic chromium on the surface of aluminum plates. The chromating liquid used for forming the chromate film may be a roll-on type chromating liquid or a reaction-type chromating liquid. Detail description of these two kinds of chromating liquids will be given below.

As regards the roll-on type chromating liquid, aqueous solutions containing 5–90 g/l as total chromium ions can be used. When the content is less than 5 g/l as total chromium ions it is difficult to form a chromate film in an amount of 10 $mg/m^2$ or more in terms of metallic chromium, whereas when it is higher than 90 g/l it is difficult to form a chromate film in an amount of 150 $mg/m^2$ or less in terms of metallic chromium. In the chromating liquid which may be used, the ratio of trivalent chromium ions to hexavalent ones must be 0.25–1.5 by weight. When the ratio of trivalent chromium ions to hexavalent ones is less than 0.25 by weight, it results in insufficient resistance to chromium elusion at the phosphating step, whereas when the ratio is higher than 1.5 by weight, it results in insufficient corrosion resistance. To attain a total chromium ion concentration of 5–90 g/l and a ratio of trivalent chromium ions to hexavalent ones of 0.25–1.5 by weight, it is appropriate to select the concentration of hexavalent chromium ions from the range of 3–50 g/l and that of trivalent ones from the range of 2–40 g/l.

The treating liquid used for forming the chromate film preferably contains 1–100 g/l of phosphate ions, the weight ratio of phosphate ions to total chromium ions being selected from the range of 0.1–1.2, whereby the resistance to chromium elusion can be improved more effectively. Further, the chromating liquid preferably contains silica sol in a weight ratio thereof to total chromium ions of 0.1–1.2, whereby the adhesion of the chromate film to the base metal surface can be further improved.

As regards the reaction-type chromating liquid, mention may be made, for example, of aqueous solutions containing the following three kinds of acids, that is, 0.4–10 g/l of chromic acid, 1.5–50 g/l of phosphoric acid and 0.05–5 g/l of hydrofluoric acid, and aqueous solutions containing the following three kinds of acids, that is, 0.4–10 g/l of chromic acid, 0.1–10 g/l of nitric acid and 0.05–5 g/l of hydrofluoric acid. When the concentration of chromic acid is less than 0.4 g/l, that of phosphoric acid is less than 1.5 g/l or that of hydrofluoric acid is less than 0.05 g/l in the former solution, much time is required for the chromate film formed to attain a weight of 10–150 mg/$m^2$ in terms of chromium ions, which is inefficient. Similarly, when the concentrations of the three kinds of acids in the latter solution are less than 0.4 g/l for chromic acid, less than 0.1 g/l for nitric acid and less than 0.05 g/l for hydrofluoric acid, much time is required to reach 10–150 mg/$m^2$ in terms of metallic chromium, which is inefficient.

In using either the reaction-type or the rollon type chromating liquid, it is important that the chromate film should be formed in an amount of 10–150 mg/$m^2$ in terms of metallic chromium. When the amount of the chromate film is less than 10 mg/$m^2$ as metallic chromium its corrosion resistance is insufficient, whereas when it exceeds 150 mg/$m^2$ the corrosion resistance levels off, which is economically disadvantageous.

Then, on the chromate film, is coated an organic macromolecular resin composition comprising as organic macromolecular resins urethane resin and at least one kind of resin selected from polyester resin and epoxy resin, as a lubricating additive 5–20%, relative to total solids, of a wax of a saponification value of 30 or less, and further 5–30% as solid, based on total solids, of a silica sol, which is then dried to form 1–10 g/$m^2$ of a film layer.

The resin used herein must have a composition which give well-balanced properties embracing adhesion, elongation, shear strength, corrosion resistance, abrasion resistance and chemical resistance. To meet such requirements for properties, a mere thermoplastic resin is not satisfactory and the use of the following kinds of thermosetting resin in combination is necessary.

Thus, resin systems which can meet the above-mentioned purpose are those which contain urethane resin and at least one kind of resin selected from polyester resin and epoxy resin, preferably those in which the epoxy resin is of a structure having a sulfide skeleton (S—S) in its molecular main chain. Resin systems with such combinations grow into macromolecules and form films through the crosslinking reaction of the isocyanate group of the urethane resin with functional groups (e.g., hydroxyl group, carboxyl group and epoxy group) possessed by the polyester resin and/or the epoxy resin.

Though the crosslinking reaction proceeds with said combined resin systems alone, an isocyanate compound, an amino compound or such, which are called a curing agent, may be added to the system as occasion demands. Particularly preferable is the use of a resin system having two or more functionality of blocked isocyanate groups, because then the crosslinking reaction does not proceed at room temperature but proceeds on heating and hence a good shelf life can be obtained.

Substances used for blocking the isocyanate group of urethane resin may be monofunctional blocking agents such as phenol, cresol, aromatic secondary amines, tertiary alcohols, lactams, oximes and the like. Examples of urethane resins having isocyanate groups which may be used are the monomers, dimers and trimers of aromatic diisocyanates such as tolylenediisocyanate, diphenylmethane diisocyanate, xylylene diisocyanate and the like; the reaction products thereof with polyether polyols, polyester polyols and the like; alicyclic isocyanates which are the hydrogenated derivatives thereof; the reaction products of the monomers, dimers and trimers of alicyclic and aliphatic isocyanates, such as isophorone diisocyanate, hexamethylene diisocyanate and the like, with polyether polyols, polyester polyols or such; and the mixtures thereof.

Examples of the polyether polyol include polyols obtained by the addition of ethylene oxide, propylene oxide and the like to low molecular weight glycols such as ethylene glycol, propylene glycol, bisphenol A or such; polyoxytetramethylene glycol; and so forth.

Examples of the polyester polyol include polyesters obtained by the dehydrating condensation of low molecular weight glycols with dibasic acids and lactam polyols obtained by the ring-breakage polymerization of lactams, such as e-caprolactam and the like, in the presence of low molecular weight glycols.

The urethane resins having the form of blocked isocyanate compounds undergo crosslinking on heating. One useful method for further improving such properties of coating film as formability, chemical resistance and corrosion resistance comprises incorporating into the urethane resin an polyester resin or an epoxy resin which have a functional group capable of reacting with the resin having the isocyanate structure, such as the hydroxyl group, carboxyl group, epoxy group and the like, and heating the mixture to effect crosslinking and thereby to improve functionality.

The present inventors have found that said method of improving the functionality of film by the incorporation of ester resin or epoxy resin is capable of attaining marked improvement of formability, corrosion resistance and chemical resistance as compared with a method which uses an isocyanate compound as a curing agent or a method of forming film by crosslinking an acrylic-modified or epoxy-modified product of urethane resin, alone.

The content of the urethane resin in the organic macromolecular resin composition is 30–95% by weight relative to the total resin components. The amount to be incorporated of polyester resin or epoxy resin having a reactive functional group, such as the hydroxyl group, carboxyl group, epoxy group and the like, is suitably 5-70% in terms of solid weight ratio in the organic macromolecular resin composition. When the amount is less than 5% the effect of incorporation is poor, whereas when it is higher than 70%, the excellent formability improving effect of urethane resin is not satisfactorily exhibited. The effect of incorporation of polyester resin largely lies in improving formability and corrosion resistance.

Epoxy resins exhibit a large effect in improving adhesion, chemical resistance and corrosion resistance, but they are generally hard and can be elongated only to a small extent, so that their formability improving effect is small. The present inventors have found that, particularly preferably, incorporation of an epoxy resin of a structure having a sulfide skeleton (i.e., S—S) in the molecular main chain greatly improves adhesion, chemical resistance and corrosion resistance and moreover markedly improve formability. This is attributable to the effect of rubber-like property due to the sulfide skeleton (S—S). However, the use of such resin-based film alone is not sufficient for achieving intended high degree of formability, so that using a lubricating additive in combination therewith is necessary.

The use of a wax of a saponification value of 30 or less as a lubricating additive greatly improves formability and additionally ensures the required properties including corrosion resistance and chemical resistance after forming. As regards the lubricating additives which can improve formability, although various lubricating additives are already known including those based on hydrocarbons, fatty acid amides, esters, alcohols, metallic soaps and inorganic substances, substances which will come to exist on the surface of resin film formed rather than being dispersed therein should be selected to decrease the friction between the surface of the material to be formed and a die and to make the lubricating effect exhibited to a full extent.

When a lubricating additive is present dispersed in the resin film formed, the surface friction coefficient is high and the resin film is liable to be broken, resulting in peeling and deposition of powdery substances, causing a poor appearance called "powdering phenomenon" and lowering in formability. As substances which will come to exist on the resin film surface, there are selected those substances which are incompatible with the resin and have a low surface energy. Typical examples of such substances are waxes of a saponification value of 30 or less and fluorine compounds. Waxes with a saponification value of larger than 30 have a high polarity and tend to be compatible with the resin, so that they exist with difficulty on the resin surface at the time of film formation, hence cannot give a sufficient lubricating effect.

Particularly preferred are waxes having a saponification value of 0, which are less compatible with the resin. Examples of such waxes are non-oxidation type waxes based on polyethylene, microcrystalline wax and paraffin. In using these waxes, they may be dispersed in a solvent such as toluene and the like and then added to solvent-soluble or solvent-dispersible resins, or alternatively non-oxidation type waxes may be oxidized to a saponification value of 30 or less to make them water-dispersible and then added to water-soluble or water dispersible resin. The wax thus added does not become compatible with resin even when the resin is molten at the time of film formation by heating and moreover has a low surface energy, so that the wax will come to exist on the surface part of the resin film and solidify at the time of cooling.

The lubricating additive is added in an amount of 5-20% relative to total solids. When the amount is less than 5% the formability improving effect is small, whereas when it exceeds 20% the formability is deteriorated owing to decrease in the elongation and strength of resin film.

Fluorine compounds are incompatible with the resin and has a low surface energy, so that they come to exist on the surface part of resin film and exhibit excellent lubricating property. However, they must be added in approximately twice the amount of above-mentioned waxes to attain the same level of formability as obtainable by the waxes. In such cases, the proportion of the resin components in total film composition becomes small, resulting in poor corrosion resistance.

Silica sols to be used are not particularly restricted. Specific examples thereof include Aerosils #200, #300 and #R972 manufactured by Nippon Aerosil Co., and ETC-ST and XBA-ST manufactured by Nissan Kagaku Kogyo K.K. A particularly important point with respect to silica sol is that it is to be added in a range of 5-30%, in terms of the solid material of the silica sol, relative to total solids. When the amount is less than 5% relative to total solids the adhesion of resultant film is insufficient, whereas when it exceeds 30% relative to total solids the resultant film is brittle and is poor in adhesion.

Various other additives may also be added, which include conductive substances for improving weldability, color pigments for improving decorability, and further antisettle agents, leveling agents, thickeners and so forth.

The amount of the film layer is preferably 1-10 $g/m^2$. When the amount is less than 1 $g/m^2$ the film is poor in lubricity. Amounts higher than 10 $g/m^2$ are economically disadvantageous.

The composite film obtained according to the present invention combines the abrasion resistance of urethane resin, the effect of improving corrosion resistance and chemical resistance provided by using polyester resin and/or epoxy resin in combination and the lubricating effect of wax incompatible with resin. Together with the corrosion resistance improving effect of chromate film and the formability improving effect due to excellent adhesion to resin film of the chromate film, applied as the undercoating treatment for the organic macromolecular resin composition, the composite film gives a high degree of formability, i.e. excellent lubricity, and excellent effects in improving corrosion resistance, weldability, stain resistance, chemical resistance and paintability. Thus, the intended objects of simplification of process steps, reduction of cost and improvement of working environment can be achieved.

DESCRIPTION OF THE PREFERRED EMBODIMENT

The effect of the present invention will be described in detail below with reference to Examples and Comparative Examples.

1. Preparation of Test Pieces

1) Sample plate

An aluminum alloy plate (JIS, A5052) 1.0 mm in thickness was taken as a sample.

2) Degreasing

The sample plate was degreased with an alkaline degreasing agent (Fine Cleaner 359, a trade name, mfd. by Nihon Parkerlizing Co., Ltd.).

3) Undercoat chromate film

Roll-On Type Chromate Treatment

The chromating liquids listed in Table 1 given later were used. The liquid was coated with a grooved roll coater in an amount of 3 ml/$m^2$ and dried in an ambient temperature of 220° C. (peak metal temperature: 100° C.) for 10 seconds.

The amount of chromium deposited was controlled by means of the concentration of chromating liquid.

Reaction-Type Chromate Treatment

The sample plate was treated with a reaction-type chromating liquid with the liquid compositions and under the treating conditions shown in Table 2, then rinsed with water and dried at an ambient temperature of 220° C. (peak metal temperature: 100° C.) for 10 seconds.

4) Application of organic macromolecular resin composition

The organic macromolecular resin composition shown in Table 3 was coated with a bar coater and dried at an ambient temperature of 260° C. (peak metal temperature: 190° C.) for 30 seconds.

2. Performance Test

1) Formability

A high speed cupping deep-drawing test was conducted under conditions of a blank holder pressure of 0.7 Ton and a deep drawing speed of 10 m/minutes.

Blank diameter: 88 mm, punch diameter: 40 mm; the limiting drawing ratio in this case is 2.20.

Criterion for evaluation:

◎: Drawn through at a limiting drawing ratio of 2.25

○: Drawn through at a limiting drawing ratio of 2.20

×: Cannot be drawn through

2) Corrosion resistance

A salt spraying test according to JIS-Z-2731 was conducted and the situation of white rust development was observed.

Criterion for evaluation:

○: Rust develops in less than 5% of total area.

Δ: Rust develops in not less than 5% and less than 20% of total area.

×: Rust develops in not less than 20% of total area.

3) Solvent resistance

A solvent resistance test was first conducted and then corrosion resistance was evaluated as described above.

The solvent resistance test comprises exposure to trichloroethylene vapor for 3 minutes.

Criterion for evaluation (in comparison with non-explosure):

○: No deterioration of properties is observed.

Δ: Minor deterioration of properties is observed (rust developping area increases by less than 5%).

×: Deterioration of properties is observed (rust developping area increases by 5% or more).

4) Alkali resistance test

Chromate-treated steel was cleaned with alkali under the following conditions and the amounts of attached chromium (mg/$m^2$) before and after the alkali cleaning were determined by fluorescent X-ray analysis. The alkali resistance was expressed by the following equation. The smaller value of the percent indicates the more excellent alkali resistance. The value of the percent of 0 signifies that the film has been utterly unaffected by alkali in the test.

$$\text{Alkali resistance} = \frac{\text{Amount of attached Cr before alkali cleaning (mg/m}^2\text{)} - \text{Amount of attached Cr after alkali cleaning (mg/m}^2\text{)}}{\text{Amount of attached Cr before alkali cleaning (mg/m}^2\text{)}} \times 100\%$$

Alkali cleaning was conducted by spraying a 2% aqueous solution of an alkaline degreasing agent (Palklin N364S, a trade name, mfd. by Nihon Parkerizing Co., Ltd.) comprising sodium silicate as the main component at 60° C. for 2 minutes.

5) Paint adhesion

A painted plate (coating film thickness: 25 μm) was prepared by coating the sample plate, without alkali cleaning, with a baking melamine-alkyd paint (Delicon 700 white, a trade name, mfd. by Dainippon Toryo K.K.), followed by drying and baking at 140° C. for 20 minutes.

Cross-Cut Adhesion Test

Squares 1 mm by 1 mm were cut with a cutter onto the painted plate prepared above so that the base metal was reached. Then an adhesive tape (cellophane adhesive tape) was sticked onto the cut side of the plate and then peeled off rapidly to observe the extent of peeling of the paint film.

Erichsen Cupping Test

The punch of an Erichsen tester was indented by 6 mm against the painted test plate, a cellophane adhesive tape was sticked onto the plate and then peeled off rapidly to observe the extent of failure of the paint film.

The adhesion of paint film of the test item was evaluated by classing into the following four grades according to the extent of failure of the paint film.

◎: Failure of paint film, 0%

○: Ditto, less than 10%

Δ: Ditto, not less than 10% and less than 30%

×: Ditto, not less than 30%

3. Result of Test

The results of performance tests are shown in Table 4. Examples and Comparative Examples will be described with reference to Table 4.

TABLE 1

| | Roll-on type Chromate Treatment | | | | | | | |
|---|---|---|---|---|---|---|---|---|
| | Chromating Liquid Composition | | | | | | | Amount of attached Cr |
| | $Cr^{3+}$ g/l | $Cr^{6+}$ g/l | $PO_4^{3}$ g/l | Silica g/l | $Cr^{3+}/Cr^{6+}$ | $PO_4^{3}$/T-Cr | Silica/T-Cr | ($mg/m^2$) |
| A | 5.6 | 11 | 16.7 | 8.4 | 0.50 | 1.0 | 0.5 | 50 |
| B | 14.2 | 14.2 | 11.3 | — | 1.0 | 0.4 | — | 85 |
| C | 31.7 | 31.7 | 25.3 | — | 1.0 | 0.4 | — | 190 |
| D | 7 | 28 | — | — | 0.25 | — | — | 105 |

TABLE 2

| | Reaction-type Chromate Treatment Conditions | | |
|---|---|---|---|
| | Liquid composition | Treatment Condition | Amount of attached Cr |
| E | $CrO_3$: 3 g/l<br>$HNO_3$: 0.5 g/l, HF: 1 g/l | Treating Temp.: 50° C.<br>Treating Time: 20 sec., spraying | 70 $mg/m^2$ |
| F | $CrO_3$: 3 g/l<br>$HNO_3$: 0.5 g/l, HF: 1 g/l | Treating Temp.: 50° C.<br>Treating Time: 50 sec., spraying | 180 $mg/m^2$ |
| G | $CrO_3$: 3 g/l<br>$HNO_3$: 0.5 g/l, HF: 1 g/l | Treating Temp.: 30° C.<br>Treating Time: 2 sec., spraying | 4 $mg/m^2$ |
| H | $CrO_3$: 4 g/l<br>$H_3PO_4$: 12 g/l, HF: 1 g/l | Treating Temp.: 45° C.<br>Treating Time: 15 sec., spraying | 65 $mg/m^2$ |
| I | $CrO_3$: 4 g/l<br>$H_3PO_4$: 12 g/l, HF: 1 g/l | Treating Temp.: 45° C.<br>Treating Time: 40 sec., spraying | 200 $mg/m^2$ |
| J | $CrO_3$: 4 g/l<br>$H_3PO_4$: 12 g/l, HF: 1 g/l | Treating Temp.: 25° C.<br>Treating Time: 1 sec., spraying | 4 $mg/m^2$ |

TABLE 3

| | Macromolecular Resin Compositions | | | | | | |
|---|---|---|---|---|---|---|---|
| | Resin | | | Lubricating Additive | | | Silica Sol *9 |
| | Kind | | % | Kind | | % | % |
| Present Composition | | | | | | | |
| A | Urethane | *1 | 60 | Wax a | *5 | 5 | 30 |
| | Polyester | *2 | 5 | | | | |
| B | Urethane | *1 | 65 | Wax a | *5 | 15 | 10 |
| | Epoxy a | *3 | 10 | | | | |
| C | Urethane | *1 | 60 | Wax a | *5 | 15 | 10 |
| | Epoxy b | *4 | 15 | | | | |
| D | Urethane | *1 | 40 | Wax a | *5 | 15 | 10 |
| | Polyester | *2 | 20 | | | | |
| | Epoxy b | *4 | 15 | | | | |
| E | Urethane | *1 | 50 | Wax b | *6 | 15 | 10 |
| | Epoxy b. | *4 | 25 | | | | |
| F | Urethane | *1 | 50 | Wax a | *5 | 20 | 5 |
| | Epoxy b | *4 | 25 | | | | |
| Comparative Composition | | | | | | | |
| G | Urethane | *1 | 85 | Wax a | *5 | 15 | — |
| H | Polyester | *2 | 85 | Wax a | *5 | 15 | — |
| I | Epoxy | *4 | 85 | Wax a | *5 | 15 | — |

TABLE 3-continued

| | Macromolecular Resin Compositions | | | | | | |
|---|---|---|---|---|---|---|---|
| | Resin | | | Lubricating Additive | | | Silica Sol *9 |
| | Kind | | % | Kind | | % | % |
| J | Polyester | *2 | 50 | — | | — | 40 |
| | Epoxy b | *4 | 10 | | | | |
| K | Urethane | *1 | 60 | Wax c | *7 | 15 | — |
| | Epoxy a | *4 | 25 | | | | |
| L | Urethane | *1 | 60 | Fluorine Compound (PTFE) | *8 | 15 | — |
| | Epoxy a | *4 | 25 | | | | |

Note
1) "%" in the Table refers to solid content.
2)
*1 Urethane resin, Mitec Bl-100, mfd. by Mitsubishi Chemical Industries Ltd.
*2 Polyester resin Almatex P646, mfd. by Mitsui Toatsu Chemicals, Inc.
*3 Epoxy resin a Adeka Resin EP-4000, mfd. by Asahi Denka Kogyo K.K.
*4 Epoxy resin b Flep 50 (containing S-S), mfd. by Toray Thiokol K.K.
*5 Wax a Sanwax 151-P (Saponification value = 0) mfd. by Sanyo Chemical Industries, Ltd.
*6 Wax b Hiwax 220MP (Saponification value ≦ 10) mfd. by Mitsui Petrochemical Industries, Ltd.
*7 Wax c Hoechst Wax PED522 (Saponification value = 40–60), mfd. by Hoechst Japan K.K.
*8 Fluorine Compound (PTFE) Lubron LP-100, mfd. by Asahi Glass K.K.
*9 Silica sol XBA-ST (Organosilica sol), mfd. by Nissan Kagaku Kogyo K.K.

TABLE 4

| | Results of Performance Test | | | | | | | | |
|---|---|---|---|---|---|---|---|---|---|
| | | | | Result of Performance Test | | | | | |
| | Chromate Treatment | Resin Composition | Coating weight $g/m^2$ | Formability | Corrosion Resistance | Solvent Resistance | Alkali Resistance | Cross-cut Test | Erichsen Test |
| Example | | | | | | | | | |
| 1 | A | A | 5 | ◎ | ○ | ○ | 0 | ◎ | ◎ |
| 2 | B | B | 5 | ◎ | ○ | ○ | 0 | ◎ | ◎ |
| 3 | D | C | 5 | ◎ | ○ | Δ | 1 | ◎ | ◎ |
| 4 | E | D | 5 | ◎ | ○ | ○ | 0 | ◎ | ◎ |
| 5 | H | E | 5 | ◎ | ○ | ○ | 0 | ◎ | ◎ |
| 6 | A | F | 5 | ◎ | ○ | ○ | 0 | ◎ | ◎ |
| 7 | B | A | 5 | ◎ | ○ | ○ | 0 | ◎ | ◎ |
| 8 | D | B | 5 | ◎ | ○ | Δ | 1 | ◎ | ◎ |
| 9 | E | C | 5 | ◎ | ○ | ○ | 0 | ◎ | ◎ |
| 10 | H | D | 5 | ◎ | ○ | ○ | 0 | ◎ | ◎ |
| 11 | A | E | 5 | ◎ | ○ | ○ | 0 | ◎ | ◎ |
| Comparative Example | | | | | | | | | |
| 12 | C | A | 7 | ○ | ○ | X | 15 | Δ | Δ |

TABLE 4-continued

| | | | | Results of Performance Test | | | | | |
|---|---|---|---|---|---|---|---|---|---|
| | | | Coating | Result of Performance Test | | | | | |
| | Chromate Treatment | Resin Composition | weight $g/m^2$ | Formability | Corrosion Resistance | Solvent Resistance | Alkali Resistance | Cross-cut Test | Erichsen Test |
| 13 | F | B | 7 | ○ | ○ | X | 8 | Δ | X |
| 14 | G | G | 5 | X | X | ○ | 0 | Δ | X |
| 15 | I | H | 5 | X | Δ | Δ | 6 | ○ | Δ |
| 16 | J | I | 5 | X | X | X | 0 | Δ | X |
| 17 | A | J | 5 | X | ○ | X | 0 | X | X |
| 18 | B | K | 5 | X | ○ | X | 2 | Δ | X |
| 19 | E | L | 15 | ○ | Δ | Δ | 0 | X | X |
| 20 | H | A | 0.5 | X | Δ | X | 2 | ○ | ○ |

In Examples 1-11, which are in accordance of the present invention, formability, corrosion resistance, chemical resistance and paint adhesion are all good.

In Comparative Examples 12 and 13, in which the chromate treatments differ from those according to the present invention, chemical resistance and paint adhesion are insufficient. In Comparative Examples 14-20, in which the chromate treatments and the macromolecular resin compositions are different from those of the present invention, the respective performance tested are unsatisfactory.

As set forth above, the use of aluminum plates having the composite film formed thereon according to the present invention affords advantages of simplification of process steps, reduction of cost and improvement of environment to fabricators and assemblers of household electric appliances, automobiles, building materials and so forth.

What we claim is:

1. A process for forming a composite film on a surface of an aluminum or aluminum alloy material, said process comprising:
  a) subjecting the surface of the material to treatment with liquid to form on the surface of the material a chromate film comprising chromium in an amount of about 10-150 mg/m², wherein the chromating liquid contains 0.4-10 g/l of chromic acid, 1.5-50 g/l phosphoric acid or 0.1-10 g/l of nitric acid, and 0.05-5 g/l of hydrofluoric acid, said treatment with the chromating liquid being followed by rinsing with water and drying;
  b) coating the thus formed chromate film with an organic macromolecular resin composition, said resin composition consisting essentially of
    i) urethane resin
    ii) at least one resin selected from the group consisting of polyester resin and epoxy resin,
    iii) a lubricating additive consisting of a wax having a saponification value of about 30 or less, and
    iv) a silica sol, the urethane resin being present in the composition in an amount of about 30-95% by weight of all resins in the composition, said at least one resin being present in the composition in an amount of about 5-70% by weight of all resins in the composition, said lubricating additive being present in an amount of about 5-20% of all solids in the composition, said silica sol being present in an amount of about 5 to 30% of all solids in the composition; and
  c) drying the organic macromolecular resin composition to form a film layer on the chromate film.

2. A process for forming a composite film on a surface of an aluminum or aluminum alloy material, said process comprising:
  a) treating the surface of the material with a chromating liquid to form on the surface of the material a chromate film, which is then dried, the chormating liquid containing 3-50 g/l of hexavalent chromium ions and 2-40 g/l of trivalent chromium ions, the ratio of the trivalent chromium ions to the hexavalent chromium ions being about 0.25 to 1.5 by weight, and the chromate film comprising chromium in an amount of about 10-150 mg/m²,
  b) coating the thus formed chromate film with an organic macromolecular resin composition, said resin composition consisting essentially of
    i) urethane resin,
    ii) at least one resin selected from the group consisting of polyester resin and epoxy resin,
    iii) a lubricating additive consisting of a wax having a saponification value of about 30 or less, and
    iv) a silica sol, the urethane resin being present in the composition in an amount of about 30-95% by weight of all resins in the composition, said at least one resin being present in the composition in an amount of about 5-70% by weight of all resins in the composition, said lubricating additive being present in an amount of about 5-20% of all solids in the composition, said silica sol being present in an amount of about 5 to 30% of all solids in the composition; and
  c) drying the organic macromolecular resin composition to form a film layer on the chromate film.

3. A process for forming a composite film according to claim 2, wherein the chromating liquid further contains about 1-100 g/l of phosphate ions, said phosphate ions being present in a weight ratio of about 0.1 to 1.2 with respect to all chromium ions in the chromating liquid, including said trivalent and said hexavalent chromium ions.

4. A process for forming composite film according to claim 3, wherein the chromating liquid further contains a silica sol, the weight ratio of the amount of the silica sol contained to the total chromium ions being 0.1 to 1.2.

5. A process for forming composite film according to claim 1 or 2 wherein the wax has a saponification value of 6. An article having a composite film produced by the process of claim 1 or 2.

7. An article having a composite film produced by the process of claim 3.

8. An article having a composite film produced by the process of claim 4.

9. An article having a composite film produced by the process of claim 1.

10. An article having a composite film produced by the process of claim 5.

* * * * *